United States Patent [19]

Bobsein et al.

[11] Patent Number: 5,350,834
[45] Date of Patent: Sep. 27, 1994

[54] TREATMENT OF POLYARYLENE SULFIDE/SULFONE POLYMERS

[75] Inventors: Rex L. Bobsein; Michael C. Yu; Roy F. Wright; David A. Soules, all of Bartlesville, Okla.

[73] Assignee: Phillips Petroleum Company, Bartlesville, Okla.

[21] Appl. No.: 62,641

[22] Filed: May 14, 1993

Related U.S. Application Data

[60] Division of Ser. No. 696,451, May 6, 1991, Pat. No. 5,235,034, which is a continuation-in-part of Ser. No. 432,282, Nov. 6, 1989, abandoned.

[51] Int. Cl.$^5$ ............................................. C08G 75/16
[52] U.S. Cl. ..................................... 528/485; 524/399; 524/434; 524/609; 528/388; 528/481; 528/486; 528/487; 528/490; 528/499
[58] Field of Search ............... 528/485, 388, 481, 486, 528/487, 490, 499; 524/399, 434, 609

[56] References Cited

U.S. PATENT DOCUMENTS

| | | | |
|---|---|---|---|
| 3,948,857 | 4/1976 | Feasey et al. | |
| 4,016,145 | 4/1977 | Campbell. | |
| 4,127,713 | 11/1978 | Campbell | 528/391 |
| 4,247,598 | 1/1981 | Blackwell | 428/419 |
| 4,373,091 | 2/1983 | Edmonds, Jr. | 528/481 |
| 4,418,029 | 11/1983 | Reed et al. | 264/211 |
| 4,424,338 | 1/1984 | Cleary | 528/388 |
| 4,501,884 | 2/1985 | Ostlinning et al. | 528/388 |
| 4,525,579 | 6/1985 | Idel et al. | 528/388 |
| 4,535,149 | 8/1985 | Ebert et al. | 528/388 |
| 4,769,426 | 9/1988 | Iwasaki et al. | 525/537 |
| 4,774,276 | 9/1988 | Bobsein et al. | 524/399 |
| 4,794,163 | 12/1988 | Inoue et al. | 528/388 |
| 4,801,664 | 1/1989 | Nesheiwat et al. | 525/537 |
| 4,898,904 | 2/1990 | Yu et al. | 524/399 |
| 5,015,702 | 5/1991 | Scoggins et al. | 528/485 |
| 5,235,034 | 8/1993 | Bobsein et al. | 528/490 |

FOREIGN PATENT DOCUMENTS 250174 11/1986 Japan.

*Primary Examiner*—John Kight, III
*Assistant Examiner*—Shelley A. Dodson
*Attorney, Agent, or Firm*—Beverly M. Dollar

[57] ABSTRACT

Poly(arylene sulfide/sulfone) polymers are treated in order to increase melt stability and decrease impurities by contacting the poly(arylene sulfide/sulfone) polymer with a soluble zinc compound and an acidic solution. In one embodiment, the polymer is treated first with the soluble zinc compound, followed by treatment with the acidic solution. In another embodiment, the polymer is treated in one step with a solution comprising a water soluble zinc compound in an acidic solution.

16 Claims, No Drawings

TREATMENT OF POLYARYLENE SULFIDE/SULFONE POLYMERS

FIELD OF THE INVENTION
CROSS-REFERENCE TO RELATED APPLICATION

This application is a division of prior application, Ser. No. 07/696,451, filed May 6, 1991, now U.S. Pat. No. 5,235,034 which is a continuation-in-part of application Ser. No. 07/432,282, filed Nov. 6, 1989, now abandoned.

This invention relates to the treatment of poly(arylene sulfide/sulfone) polymers. In one aspect this invention relates to a process for increasing the thermal stability of a poly(arylene sulfide/sulfone) polymer. In another aspect this invention relates to a method for increasing the purity of a poly(arylene sulfide/sulfone) polymer.

BACKGROUND OF THE INVENTION

Poly(arylene sulfide/sulfone) polymers are thermoplastic polymers of interest for film, fiber, molding, and composite applications because of their high glass transition points and good mechanical and electrical properties and chemical resistance.

Poly(arylene sulfide/sulfone) polymers can generally be prepared by the reaction of a polyhalo aromatic sulfone with an alkali metal sulfide and a polar organic compound, as disclosed in U.S. Pat. No. 4,127,713 and U.S. Pat. No. 4,808,698.

One problem experienced with poly(arylene sulfide/sulfone) polymers in the past is that they exhibited relatively low melt stability. U.S. Pat. No. 4,774,276 discloses a method to produce poly(arylene sulfide/sulfone) polymers having increased melt stability by treating the poly(arylene sulfide/sulfone) polymers with a zinc source, thereby incorporating zinc cat ions into the polymer.

For certain poly(arylene sulfide/sulfone) polymer applications, such as the molding of injection molded parts for example, it is desired that the polymer exhibit a high degree of clarity. In order for the polymer to exhibit a high degree of clarity, the polymer should be relatively free of impurities such as salt by-products and metal ions. It can therefore be seen, that the process of increasing the thermal stability of the poly(arylene sulfide/sulfone) polymer could result in introducing impurities into the polymer which affect the clarity of molded parts. It would therefore be desirable to increase the thermal stability of a poly(arylene sulfide/sulfone) polymer while not adversely affecting its purity.

For certain other applications which employ poly(arylene sulfide/sulfone) polymers, such as the production of composites, it is also desirable to have a polymer of increased purity in order to aid in the interfacial bonding of the resin and fiber used in the composite. Again, impurities in the polymer interfere with the resin/fiber interfacial bonding and are therefore undesirable, Since the thermal stability of the polymer in the composite is important also, it would be desirable to have a method of increasing the thermal stability of a poly(arylene sulfide/sulfone) polymer while not adversely affecting the purity of the polymer.

It is therefore an object of this invention to provide a process for preparing a poly(arylene sulfide/sulfone) polymer having increased melt stability. It is further an object of this invention to provide a poly(arylene sulfide/sulfone) polymer which is relatively free from impurities and is thus useful in the preparation of injection molded parts exhibiting a high degree of clarity and composites having a good resin/fiber interface.

SUMMARY OF THE INVENTION

In accordance with this invention, a poly(arylene sulfide/sulfone) polymer having increased thermal stability, which polymer is relatively free of impurities is prepared in one embodiment by contacting a poly(arylene sulfide/sulfone) polymer with a soluble zinc compound, then contacting the polymer with a dilute acidic solution. In another embodiment, the polymer is contacted with a solution comprising a mixture of a water soluble zinc compound in a dilute acidic solution.

DETAILED DESCRIPTION OF THE INVENTION

The aromatic sulfide/sulfone polymers treated in accordance with this invention can be prepared using dihaloaromatic sulfones and sulfur-containing compounds in polar organic compounds and optionally in the presence of bases and/or alkali metal carboxylates. The currently preferred poly(arylene sulfide/sulfone) is poly(phenylene sulfide/sulfone) (PPSS).

Dihaloaromatic sulfones employed in the production of the aromatic sulfide/sulfone polymers can be represented by the formula

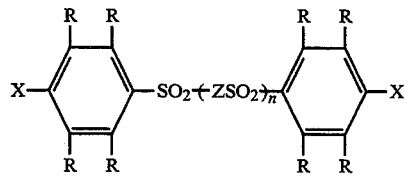

wherein each X is selected from the group consisting of fluorine, chlorine, bromine, and iodine; Z is a divalent radical selected from the group consisting of

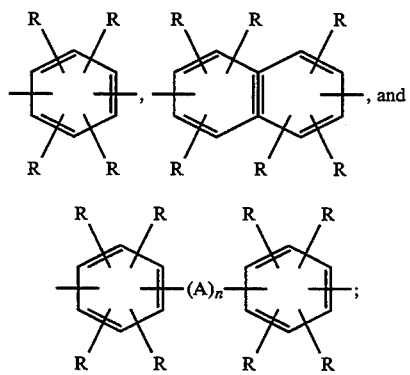

n is 0 or 1; A is selected from the group consisting of oxygen, sulfur, sulfonyl, and $CR_2$; and R is selected from the group consisting of hydrogen and alkyl radicals having 1 to about 4 carbon atoms, the total number of carbon atoms in all of the R groups in the dihaloaromatic sulfone molecule being 0 to about 12. Preferably, each n is 0. Examples of suitable dihaloaromatic sulfones that can be employed include bis(p-fluorophenyl)sulfone; bis(p-chlorophenyl)sulfone; bis(p-bromophenyl)sulfone; bis(p-iodophenyl)sulfone; p-chlorophenyl p-bromophenylsulfone; p-iodophenyl 3-methyl-4-fluorophenyl sulfone; bis(2- methyl-4- chlorophenyl)sulfone; bis(2,5 -diethyl-4-bromophenyl)sulfone; bis(3-isopropyl-4-iodophenyl)sulfone; bis(2,5-dipropyl-4-chlorophenyl)sulfone; bis(2-butyl-4-fluorophenyl)sulfone; bis(2,3,5,6-tetramethyl-4-chlorophenyl)sulfone, 2-isobutyl-4-chlorophenyl 3-butyl-4-bromophenyl sulfone; 1,4-bis(p-chlorophenylsulfonyl)benzene; 1-methyl-2,4-bis(p-fluorophenylsulfonyl)benzene; 2,6-bis(p-bromophenylsulfonyl)naphthalene; ethyl-1,5-bis(p-iodophenylsulfonyl)naphthalene; 4,4'-bis(p-chlorophenylsulfonyl)biphenyl; bis[p-(p-bromophenylsulfonyl)phenyl]ether; bis[p-(p-chlorophenylsulfonyl)phenyl]sulfide; bis[p-(p-chlorophenylsulfonyl)phenyl]sulfone; bis[p-p-bromophenylsulfonyl)-phenyl]methane; 5,5-bis[3-ethyl-4-(p-chlorophenylsulfony)phenyl]nonane, and the like, and mixtures thereof. The presently preferred dihaloaromatic sulfone due to it effectiveness and commercial availability is bis(p-chlorophenyl)sulfone.

Any suitable sulfur source can be employed according to our invention. For example, U.S. Pat. No. 3,919,177 discloses a wide variety of suitable sulfur sources which can be utilized in the preparation of poly(arylene sulfide) polymers. Suitable sources of sulfur which can be employed to prepare the poly(arylene sulfide/sulfone) polymers useful in this invention are hydrogen sulfide, alkali metal sulfides, alkali metal hydrosulfides and thioamides. It is preferred to employ an alkali metal sulfide or alkali metal hydrosulfide as the sulfur source.

Examples of suitable alkali metal sulfides include sodium sulfide, potassium sulfide, lithium sulfide, rubidium sulfide, and cesium sulfide. Examples of suitable alkali metal hydrosulfides include sodium hydrosulfide, potassium hydrosulfide, lithium hydrosulfide, rubidium hydrosulfide, and cesium hydrosulfide.

If hydrogen sulfide or an alkali metal hydrosulfide or a thioamide is employed as the sulfur source, it is preferred to also employ an alkali metal hydroxide. The preferred alkali metal hydroxide is sodium hydroxide because of availability and generally good results obtained therewith.

It is optional to employ a base in the preparation of poly(arylene sulfide/sulfone) polymers. Suitable bases according to this optional feature are alkali metal, hydroxides, alkali metal carbonates, and mixtures of alkali metal hydroxides with alkali metal carbonates. Suitable alkali metal hydroxides include lithium hydroxide, sodium hydroxide, potassium hydroxide, rubidium hydroxide, and cesium hydroxide. Suitable alkali metal carbonates include lithium carbonate, sodium carbonate, potassium carbonate, rubidium carbonate, and cesium carbonate.

It is also optional to employ an alkali metal carboxylate as a component in the polymerization process. Suitable alkali metal carboxylates can be represented by the formula $R'CO_2M$ where $R'$ is a hydrocarbyl radical selected from alkyl, cycloalkyl, and aryl and combinations thereof such as alkylaryl, arylalkyl, and the like, the number of carbon atoms in said $R'$ being within the range of 1 to about 20, and M is an alkali metal selected from lithium, sodium, potassium, rubidium, and cesium.

Examples of some alkali metal carboxylates that can be employed in the polymerization process include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate end the like and mixtures thereof.

The polar organic compounds used in preparing the poly(arylene sulfide/sulfone) polymer should be substantially liquid at the reaction temperatures and pressures employed. The polar organic compounds can be cyclic or acyclic and generally have about 1 to 18 carbon atoms per molecule. Suitable polar organic compounds include organic amides such as formamide, acetamide, N-methylformamide, N,N'-dimethylformamide, N,N'-dimethylacetate, 2-pyrrolidone, N-methyl-2-pyrrolidone (NMP), $\epsilon$-caprolactam, N-methyl-$\epsilon$-caprolactam. N,N'-ethylenedi-2-pyrrolidone, hexamethylphosphoramide, tetramethylurea, and the like and mixtures thereof.

Although the reaction temperature at which the polymerization is conducted can vary over a considerable range, generally it will be within the range of about 170° C. to about 240° C., preferably about 180° C. to about 220° C. The reaction time can vary widely, depending in part on the reaction temperature, but generally will be within the range of about 10 minutes to about 3 days, preferably about 1 hour to about 8 hours. The pressure should be sufficient to maintain the dihaloaromatic sulfone, the polar organic compound, and the water substantially in the liquid phase.

The poly(arylene sulfide/sulfone) polymers can be separated from their reaction mixture in any manner known to those of ordinary skill in the art. One suitable method employs the addition of a separation agent in order to separate the polymer from the polar organic compound and non-polymeric liquid components and unconsumed reactants. The polymer can then be washed with water and optionally water-miscible solvents such as acetone or methanol in order to remove impurities and by-product salts. If desired, at least a portion of the washing can be conducted at an elevated temperature, for example up to about 250° C.

In a first embodiment of this invention, subsequent to the recovery of the poly(arylene sulfide/sulfone) polymer and washing, if employed, the poly(arylene sulfide/sulfone) polymer is contacted with soluble zinc compound at a sufficient temperature and pressure for a period of time sufficient to incorporate an amount of zinc cations effective to improve the melt stability of the polymer. Subsequent treating the poly(arylene sulfide) polymer with the soluble zinc compound, the polymer is treated with a dilute acidic solution in order to reduce impurities.

In a second embodiment of this invention, the polymer is contacted with a solution comprising a water soluble zinc compound in a dilute acidic solution, at a sufficient temperature and for a period of time sufficient to improve the melt stability of the polymer and reduce impurities in the polymer.

In the first embodiment of this invention, any suitable soluble zinc compound can be employed. It is preferred that the zinc compound be a water soluble zinc salt. It is even more preferred that the zinc salt be a zinc halide or a zinc carboxylate. The salts of zinc which are more preferred include zinc chloride, zinc fluoride, zinc bromide, zinc iodide, zinc acetate, and the like and mixtures thereof. The most preferred zinc salts due to their effectiveness and availability are zinc chloride and zinc acetate.

In the second embodiment any suitable water soluble zinc compound can be used. The compounds listed above as preferred for the first embodiment are also preferred for the second embodiment.

Any suitable organic or inorganic acids which are water soluble can be used in the acidic solution in either the first or second embodiments. Examples of suitable organic acids include, but are not limited to acetic acid, formic acid, oxalic acid, fumaric acid, and monopotassium phthalic acid. Time presently preferred organic acid is acetic acid. Examples of suitable inorganic acids include, but are not limited to, hydrochloric acid, monoammonium phosphate, sulfuric acid, phosphoric acid, boric acid, nitric acid, sodium dihydrogen phosphate, ammonium dihydrogen phosphate, carbonic acid and $H_2SO_3$. The presently preferred inorganic acid is phosphoric acid.

The amount of the soluble zinc compound added to contact the polymer in either embodiment can vary depending upon the qualities desired in the final treated polymer. Generally the amount of soluble zinc compound used to contact the polymer will be within the range of about 0.01 to 10, preferably about 0.25 to 2 weight percent based on the weight of the polymer.

It is within the scope of this invention to employ the soluble zinc compound in an aqueous solution. If such a solution is used, the concentration of the zinc salt in solution preferably can range from the smallest amount effective to treat time polymer up to the solubility limits of the particular salt employed.

The amount of acidic solution employed will depend upon the strength of the particular acid. Generally, the amount of the acidic component present in the acidic solution will not exceed about 10 weight percent of the total weight of the acidic solution. Preferably the amount of acidic component present in the solution will range from about 0.01 to about 10 weight percent, more preferably from about 0.025 to about 5 weight percent. The amount of acid used will generally be in the range of about 0.5 to about 20 weight percent, preferably from 1 to 15 weight percent, based on the weight of the polymer.

In the first embodiment, the polymers are generally contacted with the zinc compound at a temperature of about 0° C. to 300° C. Preferably the polymers are contacted with the zinc compound at a temperature of about 40° C. to 200° C.

Generally, the polymers are contacted with the acidic treating solution of the first or second embodiments at a temperature of about 0° C. to 300° C. Preferably, the polymers are contacted with the treating solution at a temperature of about 40° C. to 200° C. The pressure employed in the contacting step may vary from about 0 to 1500 psig.

In the first embodiment, the time for contacting the polymers with the zinc compound can vary widely, depending, in part, on the temperature of contacting and the nature of the polymers. The contacting time will generally be within a range of about 30 seconds to 30 hours, preferably from about 1 minute to 1 hour. The pressure employed should be sufficient to maintain liquid phase conditions and will generally range from about 0 to 1,500 psig. Repeated treatments can be employed, if desired, and the process can be carried out in several stages, if desired.

The heating and contacting with the soluble zinc compound in the first embodiment can be carried out with conventional equipment. A convenient method for carrying out the process is to contact the polymers and zinc compound in an enclosed tank provided with agitation. The contacting can be carried out in a single vessel or with a plurality of vessels. The polymers can be separated from the zinc compound solution after contacting by suitable techniques including filtration and the like.

The time for contacting the polymers with acidic solution in either the first or second embodiments can very widely, depending in part on the temperature and particular polymer employed. The contacting time will generally be within a range of about 30 seconds to 30 hours, preferably from about 1 minute to 3 hours. Repeated treatments can be employed if desired, and the process can be carried out in several stages if desired.

The heating and contacting with the acidic treating solution can be carried out with conventional equipment. A convenient method for carrying out the process is to contact the polymer and acidic solution in an enclosed tank provided with agitation. The contacting can be carried out in a single vessel or with a plurality of vessels.

When practicing this invention, the amount of acidic treating solution, temperature of treatment, and time of treatment should be such that substantially no oxidative curing of the poly(arylene sulfide/sulfone) polymer occurs.

In either embodiment following the treatment of the poly(arylene sulfide/sulfone) polymer with the acidic treating solution, the polymer is recovered by conventional means, for example such as filtration. The polymer can subsequently be washed with water, and optionally water-miscible solvents at ambient or elevated temperatures up to about 250° C. The washing process can be repeated several times if desired.

The final recovered poly(arylene sulfide/sulfone) polymer can optionally have other ingredients incorporated including extenders, fillers, pigments, plasticizers, stabilizers etc. It should be noted, however, that for some applications, such as for example, molded parts, additives which might adversely affect the clarity of the parts may be undesirable. The poly(arylene sulfide/sulfone) polymers treated by the present invention exhibit enhanced clarity due to their relatively low levels of impurities.

For injection molding applications, the poly(arylene sulfide/sulfone) polymer melt flow (according to ASTM Procedure D 1238, Condition 343/5.0) will generally be in the range of about 5 to about 300 g/10 minutes, preferably about 15 to 150 g/10 minutes. Impurities, measured as ash levels, should be below about 0.05 wt. % to attain the enhanced part clarity of the present invention. Any suitable equipment can be used to perform the injection molding of the invention polymers. The molder barrel temperature will generally be between about 300°–360° C., preferably from 325°–350° C. Mold temperatures will typically be between about 40°–200° C., preferably between 120°–175° C.

In certain applications at is desirable to add additional strength to the polymer. Polymer strength can be increased by incorporating strengtheners such as fibers into the polymer to form a composite material. Preferred strengtheners, due to their effectiveness, are inorganic fibers such as asbestos, glass, and carbon and the like. It has been found that poly(arylene sulfide/sulfone) polymers treated according to this invention achieve an improved interface between the poly(arylene sulfide/sulfone) polymer and carbon fibers in the preparation of composite materials.

Poly(arylene sulfide/sulfone) polymer composites can be prepared using any suitable method for combining the polymer and reinforcing material into a structure with the desired properties. For example, a continuous strand of carbon fiber can be contacted with the polymer in the form of a powder or a slurry and the polymer impregnated strand can be pulled through a heated die to melt the polymer. The extruded composite is cooled into the desired shape. Further treatments can include thermal reshaping, stacking, molding, and the like, such as the processes described in U.S. Pat. No. 4,680,224. Melt processing temperatures for poly(arylene sulfide/sulfone) polymers are generally between about 325°–350° C.

Poly(arylene sulfide/sulfone) resins suitable for composite formation will generally have melt indexes in the range of about 5 to 150 g/10 min. and have ash levels below about 0.05 wt. %.

EXAMPLES

The examples provided herein are intended to assist in a further understanding of this invention. Particular materials employed, species and conditions are intended to illustrate this invention and are not meant to limit the reasonable scope thereof.

The melt stability of the polymers was assessed by noting the change in the rate of melt flow of each polymer after being retained in a barrel of a melt index apparatus under ASTM D1238 conditions for a time ranging from about five minutes to about thirty minutes at an elevated temperature. That temperature is 343° C. for poly(phenylene sulfide/sulfone) polymers.

The melt flow measurement at arbitrarily selected times is determined by extruding the molten polymer through the orifice in the barrel using a five kilogram driving weight. The time required to extrude a predetermined volume of polymer through the orifice is recorded and the weight of the cooled extrudate is measured. The melt flow is calculated in terms of grams of polymer extruded per 10 minutes of flow. If little or no change occurs in the melt flow of the polymer using bold periods of five minutes and thirty minutes, then it is apparent that a stable melt flow product is being tested. Generally, a melt flow decrease occurs, indicated by a longer extrusion time required to extrude a predetermined amount of polymer from the barrel. However, in some instances, a melt flow increase occurs, indicated by a shorter time required to extrude a predetermined amount of polymer from the barrel.

Ash values were determined by burning the weighed polymer sample in a platinum dish at 540° C. Residual carbonaceous material was removed by heating the dish and contents at 540° in a muffle furnace. The ash level is calculated as a weight percent of the original polymer weight. Zinc levels were determined by plasma analysis. The acetic acid used in the examples was glacial (100%) acetic acid. The zinc acetate used in the examples was the dihydrate form. Phosphoric acid was commercial 85% phosphoric acid.

Example I

This example is a control run outside the scope of the present invention and illustrates time result of contacting a poly(arylene sulfide/sulfone) polymer, poly(phenylene sulfide/sulfone) (PPSS) polymer with acetic acid, without employing a zinc ion wash.

The polymer was prepared by charging 1.5 g-mole of bis(p-chlorophenyl)sulfone, 1.5 g-mole of sodium acetate, 3.0 g-mole of sodium carbonate, 12 g-mole of NMP, 10.13 g-mole water, and 1.47 g-mole of sodium hydrosulfide (NaSH) to a two gallon stainless steel reactor. After the reactor was sealed and purged with nitrogen, the agitator was started and adjusted to 600 rpm. The reaction mixture was heated to 200° C. and held for 3 hours. After the reaction mixture was cooled and filtered, it was combined with the products of several similar polymerizations for further treatment. A 616.4 g sample of the PPSS polymer was charged with 18.5g of acetic acid and 4 liters of deionized water to an autoclave. The mixture was heated to 180° C. and held for 30 minutes with stirring, cooled, and filtered. The recovered polymer was washed three times with hot (90° C.) deionized water, filtered, and dried to yield Polymer 1. Polymer 1 was tested and found to contain 0.02 weight % ash. A melt flow stability test yielded melt flow values of 49 g/10 minutes with a five minute hold and 29 g/10 minutes for a thirty minute hold. The 30 minute extrudate was dark and contained many voids.

The results described above demonstrate that although the acetic acid treatment produces a low polymer ash level, the polymer melt stability is unsatisfactory, as shown by the change in melt flow (MF) between 5 and 30 minute holds as well as by the dark color and voids observed in the 30 minute extrudate.

Example II

This example demonstrates the advantage of the process of the first embodiment of the present invention over a single zinc salt treatment without an acid treatment. A PPSS polymer was prepared by first mixing 55.1 liters of NMP and 8.7 kg of a 50 wt. % solution of NaOH in a reactor at about 150° C. and then adding 13.8 kg of a 60 wt. % solution of NaSH. The mixture was held at about 150° C. and was then transferred to a 90 gallon stirred reactor with a NMP flush of 60 liters. The polymerization reactor contained a mixture of 41.8 liters of NMP, 16.9 kg of deionized water, 11.95 kg of sodium acetate, 3.9 kg of sodium carbonate and 43.6 kg of bis(p-chlorophenyl)sulfone at about 90° C. The reactor was heated to 200° C. in about 65 minutes and held for 210 minutes at a reactor pressure in the range of 204–207 psig. At the end of the polymerization, 20.1 kg of deionized water was added to the reactor mixture and the mixture was cooled to about 100° C.

The reactor slurry was removed from the reactor and the reactor was flushed with deionized water. After the solid polymer was filtered, the polymer was slurried with ambient, deionized water and filtered. The polymer was treated by adding 340g of zinc acetate in solution and heating to 177° C. for approximately 10 minutes. Subsequently, the polymer was washed once with ambient deionized water, filtered, and dried. The resulting polymer was combined with several other batches prepared in a similar manner to produce Polymer 2 having a melt flow value of 39 g/10 min.

A portion of Polymer 2 was treated with acetic acid by charging an autoclave with 40 g. of Polymer 2, 1.0 g. of acetic acid, and 400 ml of deionized water. The mixture was heated to 180° C. for 30 minutes and the contents were cooled, filtered, and the treated polymer was washed with room temperature deionized water until the filtrate was clear. After this polymer (denoted Polymer 3) was dried, it was tested as described before. The test results in Table I show that the invention Polymer 3 had much lower ash and formed a clearer extrudate than control Polymer 2. There was a relatively small change in MF between 5 minute and 30 minute holds for both polymers.

TABLE I

| Polymer | Treatment | Ash, wt. % | 5 minute MF | 5 minute Extrudate | 30 minute MF | 30 minute Extrudate |
|---|---|---|---|---|---|---|
| 2 | Zinc only | 0.17 | 39 | Hazy | 42 | Darker |
| 3 | Zinc, Acid | 0.02 | 35 | Clear | 37 | Darker |

Example III

This example demonstrates the effect of the process of this invention on injection molded parts made from PPSS. A portion of Polymer 2, the preparation of which was described in Example II, was washed on a larger scale to provide more invention polymer similar to Polymer 3. A 500 g sample of Polymer 2, 4000 ml deionized water, and 12.5 g acetic acid were charged to an autoclave, heated to 180° C. for 30 minutes with stirring, cooled, and filtered. The recovered polymer was washed with deionized water until the filtrate was clear, and then the polymer was dried. Several more batches of Polymer 2 were treated as described above and the combined batches were designated Polymer 4. A comparison of the results for Polymers 2 and 4 in Table II shows that invention Polymer 4 has less sodium, zinc, and ash than the control Polymer 2.

Polymers 2 and 4 were injection molded on an Arburg Allrounder 305 ECO molder with a barrel temperature of 640° F. and a mold temperature of 275° F. Both polymers were stable during molding with no color change or gas formation. Molded parts from Polymer 4 were more transparent than parts from Polymer 2. A comparison of physical properties of the molded parts set out in Table III shows that the two polymers have similar molded part properties except for a higher unnotched Izod impact value for Polymer 4. The molded bars from Polymer 2 are hazy, but bars from Polymer 4 are clear.

TABLE II

| PPSS Polymers | Polymer 2 | Polymer 4 |
|---|---|---|
| Zinc treatment | yes | yes |
| Acid treatment | no | yes |
| MF (5 min.) g/10 min. | 42 | 37 |
| MF (30 min.) g/10 min. | 43 | 47 |
| Na, ppm | 27 | 6 |
| Zn, ppm | 814 | 59 |
| Ash, wt. % | 0.17 | 0.02 |

TABLE III

| Injection Molded PPSS | Polymer 2 | Polymer 4 |
|---|---|---|
| Zinc treatment | yes | yes |
| Acid treatment | no | yes |

TABLE III-continued

| Injection Molded PPSS | Polymer 2 | Polymer 4 |
|---|---|---|
| Flex modulus, ksi | 480 | 485 |
| Flex strength, ksi | 20.7 | 21.9 |
| Tensile strength, ksi | | |
| (Yield) | 13.5 | 13.5 |
| (Break) | 9.6 | 10.4 |
| Elongation, % | | |
| (Yield) | 11 | 11 |
| (Break) | 16 | 14 |
| Izod impact, ft. lb/in | | |
| Notched | 0.2 | 0.2 |
| Unnotched | 14.5 | 20.2 |

Example IV

A PPSS sample was given several different treatments to demonstrate the advantage of the present invention over alternate treatments. PPSS Polymer 5 was prepared in a manner similar to the procedure described in Example II except that no zinc salt treatment was used. In each of the following treatments, 40 g of Polymer 5 was placed in an autoclave with 400 ml of deionized water and any other ingredient. This mixture was heated to 185° C. with stirring for 60 minutes for water and zinc acetate (4 g) treatments or at 180° C. for 30 minutes for acetic acid (1 g) treatments. Each mixture was then cooled, filtered, and washed with hot water until the filtrate was clear. The dried polymer was subsequently evaluated by determination of the MF values after 5 and 30 minute hold times.

Polymer 6 was washed only with hot (185° C.) water and Polymer 7 was treated with zinc acetate. An acetic acid treatment was used for Polymer 8, while a first zinc treatment was followed by the direct addition of acetic acid to the mixture for Polymer 9. Polymer 10 was produced by an acetic acid treatment followed by a zinc acetate treatment. Polymer 11 was treated with zinc acetate followed by an acetic acid treatment. The two treatments used in preparing Polymers 10 and 11 were separated by a filtration and water wash.

Polymers 5 through 11 were evaluated by measuring melt flow changes between 5 and 30 minutes hold times and by noting extrudate appearances. The results listed in Table IV show that significant changes in melt flow occurred between 5 and 30 minute hold times with Polymers 6, 7 and 8. Foamy extrudates were observed with Polymers 5, 6, 7, 9 and 10. Polymer 11, made with the process of the present invention, was the best polymer in this group with a small change in melt flow and relatively few voids in the extrudate.

In Table IV below, the term "gassy", when used to describe the appearance of the extrudate, means that the extrudate contained observable voids but was generally translucent. The term "foamy" means that the extrudate contained considerably more voids such that the extrudate approached opacity.

TABLE IV

| Polymer | Treatment | 5 Minute MF | 5 Minute Extrudate | 30 Minute MF | 30 Minute Extrudate |
|---|---|---|---|---|---|
| 5 | None | 32 | Gassy | 27 | Foamy |
| 6 | Hot Water | 52 | Foamy | 0 | Dark |
| 7 | Zn | 136 | Foamy | 112 | Dark Foamy |
| 8 | Acid | 120 | Gassy | 0 | Black |
| 9[a] | Zn, Acid | 64 | Gassy | 72 | Foamy |
| 10[b] | Acid, Zn | 66 | Foamy | 73 | Foamy |
| 11[b] | Zn, Acid | 55 | Slightly | 50 | Gassy |

TABLE IV-continued

| Polymer | Treatment | 5 Minute | | 30 Minute | |
|---|---|---|---|---|---|
| | | MF | Extrudate | MF | Extrudate |
| | | | Gassy | | |

[a] The acetic acid was added directly to the autoclave mixture without polymer isolation.
[b] The polymer from the first treatment step was filtered, washed with water, and then treated in the indicated second step.

Example V

Several PPSS polymers were converted into composite structures to demonstrate the advantages in composite properties of polymers produced according to the present invention.

Polymer 12 is a control polymer produced with a zinc acetate treatment. This polymer was polymerized in a process similar to that described in Example II and was treated with 450 g of zinc acetate in 304 liters of deionized water. Polymer 1 is the polymer described in Example I and is another control polymer treated with an acid. An invention polymer was made using a polymerization similar to that described in Example II followed by the normal water washes, a hot zinc acetate treatment (450 g of zinc acetate in 304 liters of deionized water), and an acetic acid treatment (667 g of acetic acid in 304 liters of deionized water). Two samples, designated Polymers 13 and 14, were taken from the invention polymer for composite formation. The polymer properties in Table V show that the invention Polymers 13 and 14 have low ash levels and good melt stability. Control Polymer 12 has good melt stability, but high ash. Control Polymer 1 has low ash, but poor melt stability.

TABLE V

| | | | Melt Flow, g/10 Min. | |
|---|---|---|---|---|
| Polymer | Treatment | Ash, wt. % | 5 Minute | 30 Minute |
| 12 | Zinc | 0.31 | 70 | 71 |
| 1 | Acid | 0.02 | 49 | 29 |
| 13 & 14 | Zinc, Acid | 0.01/0.04 | 68 | 70 |

These polymers were converted into composite structures containing 66 wt. % carbon fiber by pultruding a preprag structure using continuous carbon fiber and a PPSS slurry bath.

All PPSS polymers were ground to a fine powder with a particle size of about 20 micron. A slurry bath was prepared using 135 g of polymer powder, 2500 g of distilled water, and two ml of an ethoxylated monylphenol (Triton X-100 ®) surfactant. An addition bath to makeup for polymer consumption during the run typically contained 380 g of polymer powder, 2500 g distilled water, and 2 ml of the surfactant. Either two or three 12k tows or Hercules AS-4 ® carbon fiber were passed through the slurry bath at about 125cm/min., through a drying zone, into a heated die, and to a pillar. The dryer surface temperatures were about 360°–450° C. and the die temperatures were about 365°–369° C. Polymer 13 was produced with a slightly higher dryer temperature (about 445° C.) and lower tow tension (about 105 g) than Polymer 14 (about 435° C. and about 250 g). Conditions were adjusted to obtain a product with about 66 weight percent carbon fiber and about 34 weight percent resin. The extruded tape (about 2.5 cm wide and about 0.13 mm thick) was plied and molded at 343° C. and 300 psig in a press to form a panel about 1.5 mm thick for testing).

The four composite samples were evaluated for physical properties and the results are summarized in Table VI below.

TABLE VI

| | PPSS Composites | | | |
|---|---|---|---|---|
| | Polymer 12 | Polymer 1 | Polymer 13 | Polymer 14 |
| First Treatment | Zinc | Acid | Zinc | Zinc |
| Second Treatment | None | None | Acid | Acid |
| Tensile Strength, ksi | | | | |
| Longitudinal | 277 | 233 | 265 | 274 |
| Transverse | 5.7 | 8.0 | 9.4 | 7.9 |
| Flex Strength, ksi | | | | |
| Longitudinal | 260 | 270 | 254 | 257 |
| Transverse | 10.5 | 14.3 | 13.3 | 11.4 |

Control Polymer 12 has the lowest transverse tensile strength of the group, showing relatively low resin-fiber interface strength. Control Polymer 1 has good transverse properties, but is limited in processing capability due to its relatively poor melt stability. Invention Polymers 13 and 14, produced under different processing conditions have good physical properties, including high transverse properties which indicate good resin-fiber interface strength.

Example VI

This example further demonstrates the process of treating PPSS according to the present invention. The PPSS starting Polymer 15 was produced using a polymerization procedure similar to the procedure described in Example II, except that the polymer was washed three times with ambient temperature deionized water and was kept moist until treated further. Starting Polymer 15 had an ash level of 0.30 wt. % and contained 16 ppm zinc. A hot water wash reduced the ash level to 0.18 wt. % and the zinc level to 6 ppm.

Several acid treatments were evaluated using different acids and varying acid levels. Polymer 15 was treated first with zinc acetate (1 wt. % at 70° C. for 60 minutes) and then with an acid at 70° C. for 60 minutes. The test results on polymers treated with the various acids are shown in Table VII. The 30 minute MF extrudate was rated for voids, color, clarity, and surface on a scale from 1 to 4, with 1 being best and 4 denoting an extreme change. For example, a very good sample might be rated 1/1/1/1 and a very poor sample would be rated 4/4/4/4. For comparison with ash and zinc levels in the following Tables, a zinc acetate treatment typically produces a polymer with ash levels of 0.25–0.30 wt. % and zinc levels of 300–600 ppm.

TABLE VII

| | Acid Washing | | | |
|---|---|---|---|---|
| Acid | Level Wt. %[a] | 30 Minute[b] Extrudate[b] Rating | Ash, wt. % | Zn, ppm |
| Acetic | 3 | 1/2/1/2 | 0.06 | 94 |
| Acetic | 6 | 1/3/1/1 | 0.07 | 103 |
| Acetic | 12 | 1/3/1/2 | 0.05 | 78 |
| Acetic | 18 | 4/2/1/4 | 0.04 | 65 |
| $H_3PO_4$ | 3 | 1/2/1/4 | 0.04 | 90 |
| $H_3PO_4$ | 6 | 2/1/1/3 | 0.04 | — |
| Formic | 3 | 4/2/1/3 | 0.02 | 42 |
| Oxalic | 3 | 1/2/1/4 | 0.05 | 94 |

TABLE VII-continued

| | Acid Washing | | | |
|---|---|---|---|---|
| Acid | Level Wt. %[a] | 30 Minute[b] Extrudate[b] Rating | Ash, wt. % | Zn, ppm |
| EDTA.Na4[c] | 3 | 4/4/4/4 | 0.25 | — |

[a]Acid level as weight % of polymer.
[b]Rating of extrudate from 30 minute hold on scale of 1 = no change to 4 = severe change for voids/color/clarity/surface properties.
[c]EDTA.Na4 = ethylenediaminetetraacetic acid, tetrasodium salt. This is a comparative example.

The test results indicate that acetic acid, phosphoric acid ($H_3PO_4$), formic acid, and oxalic acid are effective in lowering the ash level and reducing the zinc level to about 40 to 100 ppm. There is some deterioration of the 30 minute extrudate rating at the highest acetic acid level. A comparative example using the tetrasodium salt of ethylenediaminetetraacetic acid, (EDTA·Na4) produced a polymer with high ash and a poor 30 minute extrudate rating.

Another set of experiments was carried out to determine the effect of changes in the acid treatment conditions had on the resulting polymer properties. Polymer 15 was first treated with zinc acetate (1 wt. % of the polymer at 70° C. for 60 minutes) and then with acetic acid (3 wt. % of the polymer) at various temperatures and times. The results are set out in Table VIII.

TABLE VIII

| Treatment Condition Variations[a] | | | | |
|---|---|---|---|---|
| Acid Treatment Temp., °C. | Acid Treatment Time., Min. | 30 Minute[b] Extrudate Rating | Ash, wt. % | Zn. ppm |
| 115 | 97.5 | 2/2/1/2 | 0.04 | 121 |
| 50 | 97.5 | 2/1/1/2 | 0.11 | 210 |
| 115 | 15 | 1/2/1/2 | 0.11 | 160 |
| 115 | 180 | 3/2/1/3 | 0.06 | 175 |
| 115 | 15 | 3/2/1/3 | 0.08 | 224 |
| 115 | 97.5 | 2/2/1/2 | 0.05 | 145 |
| 180 | 97.5 | 2/3/1/2 | 0.04 | 83 |
| 115 | 97.5 | 1/2/1/3 | 0.08 | 196 |

[a]Portions of Polymer 15 were treated with zinc acetate and then with acetic acid using the indicated conditions.
[b]See footnote [b] of Table VII.

The results (Table VIII) show that the ash level is reduced under a wide variety of conditions. Conditions with shorter times and/or lower temperatures tend to produce polymers with higher ash levels and higher zinc levels.

Example VII

The importance of attaining a low ash level in the PPSS polymer for producing injection molded parts with enhanced clarity is demonstrated in this example. Two PPSS samples were polymerized in a manner similar to the procedure described in Example II for Polymer 2. Both samples were treated with an aqueous zinc acetate solution (450g of zinc acetate in 304 liters of deionized water at 177° C.), filtered, washed using ambient, deionized water, filtered and dried to produce Polymers 16 and 18. Portions of Polymers 16 and 18 were separated before drying and were treated with aqueous acetic acid solutions (667 g of acetic acid in 304 liters of deionized water at about 180° C.), filtered, washed with ambient deionized water, filtered, and dried to produce Polymers 17 and 19. Various properties for the above-described polymers were determined and are set out in Table IX.

TABLE IX

| | PPSS Polymers | | | |
|---|---|---|---|---|
| | Polymer 16 | Polymer 17 | Polymer 18 | Polymer 19 |
| Zinc treatment | yes | yes | yes | yes |
| Acid treatment | no | yes | no | yes |
| MF, g/10 min. | 61 | 73 | 30 | 36 |
| Ash, wt. % | 0.33 | 0.07 | 0.35 | 0.06 |
| Flex Modulus, ksi | 485 | 475 | 455 | 470 |
| Flex strength, ksi | 21.9 | 22.4 | 21.3 | 21.9 |
| Tensile strength, ksi | | | | |
| Yield | 13.7 | 13.7 | 13.7 | 13.9 |
| Break | 10.0 | 10.0 | 9.5 | 9.2 |
| Elongation, % | | | | |
| Yield | 11 | 11 | 11 | 11 |
| Break | 33 | 31 | 50 | 36 |
| Izod impact, ft. lb/in. | | | | |
| Notched | 0.4 | 0.5 | 0.6 | 0.5 |
| Unnotched | 22 | 24 | 32 | 26 |

A comparison of Polymers 16 and 17 in Table IX shows that the acid treatment used for the preparation of Polymer 17 reduced the polymer ash level from 0.33 wt. % in Polymer 16 to 0.07 wt. % in Polymer 17. Injection molded bars prepared from both polymers had similar physical properties (Table IX). There was no significant difference in clarity between bars from these two polymers. A similar comparison of polymers 18 and 19 (also shown in Table IX) shows that the acid treatment used for Polymer 19 reduced the ash level from 0.35 wt. % in Polymer 18 to 0.06 wt. % in Polymer 19. As noted for Polymers 16 and 17, there is little difference in physical properties or clarity in injection molded bars produced from Polymers 18 and 19.

The results from these polymer evaluations together with results described in Examples III indicate that injection molded parts with enhanced clarity are produced when the ash level of the polymer is below about 0.05 wt. %.

Example VIII

PPSS sample 20 was prepared for use as the starting material for the treatments to be described below. A mixture of 56.8 L of N-methyl-2-pyrrolidone (NMP) and 13.17 kg of an aqueous sodium hydroxide mixture containing 49.94 weight percent sodium hydroxide was heated to 150° C. and maintained at 150° C. for one hour. A 17.46 kg sample of an aqueous sodium hydrosulfide mixture containing 58.83 weight percent sodium hydrosulfide was added to the hot mixture and this mixture was maintained at 150° C. for 30 minutes and then charged (followed by a flush with 45.4 L of NMP) to a stirred reactor containing 3.0 kg of solid sodium acetate, 2.13 kg of solid sodium carbonate, 12.9 kg of water, 57.9 L of NMP, and 54.5 kg of bis(4-chlorophenyl)sulfone. The stirred mixture was heated to 200° C. and then maintained at 200° C. for 150 minutes. Then the mixture was heated to 210° C. and maintained at 210° C. for 10 minutes.

Deionized water (14.8 kg) was added to the reactor and the mixture was kept at about 210° C. for 10 minutes. As the reactor mixture was being cooled to about 120° C., 18.9 L of deionized water was added to the reactor at a temperature of about 350° C. The cooled mixture was removed from the reactor and washed four times with deionized water. Polymer 20 was kept wet with a PPSS content of about 40 weight percent. Where Polymer 20 is used in the following examples, the wet polymer is used and the weights given are calculated on a dry basis.

In order to characterize the starting polymer for the following examples, a sample of the wet PPSS polymer 20 was washed three times with hot (about 70° C.) deionized water and three times with room temperature (about 25° C.) deionized water. The washed polymer was dried in a vacuum oven overnight at 170° C. to produce PPSS sample 20A. Polymer 20A had a 5 minute flow rate of 31 g/10 min. and quality ratings of 4/4/4/4. The ash level of Polymer 20A was 0.53 weight percent.

Thus, PPSS made with only water washing had a high ash level and poor extrudate quality. A 30 minute flow rate was not possible due to the poor melt stability of the polymer.

Example IX

This example is an invention run according to the second embodiment in which Polymer 20 was treated with aqueous zinc acetate and acetic acid at the same time. A 540.8 g sample of Polymer 20, four liters of deionized water, 5.41 g of zinc acetate, and 16.22 g of acetic acid were charged to a 7.6 L autoclave. The autoclave was purged four times with nitrogen at room temperature. The mixture was heated to 185° C. with stirring for 60 minutes and was then cooled to 180° C. and held for 30 minutes. After the autoclave had been cooled to room temperature (about 25° C.), the autoclave contents were removed and filtered. The filtered, solid polymer was washed three times with hot (about 90° C.) deionized water and three times with room temperature (about 25° C.) deionized water. Next, the polymer was dried at 170° C. in a vacuum oven to produce Polymer 21.

Polymer 21 had a 5 minute flow rate of 54 g/10 min and an extrudate quality rating of 1/1/1/1. The 30 minute flow rate was 55 g/10 mill with an extrudate quality rating of 1/2/1/2. Polymer 21had an ash level of 0.02 weight percent.

The invention treatment of PPSS with zinc acetate and acetic acid at the same time resulted in PPSS with low ash, very good melt stability, and good extrudate quality.

Example X

Another second embodiment invention run was carried out with Polymer 20 and treatment conditions different than used in Example IX. A 500 g sample of Polymer 20, 5.0 g of zinc acetate, 15.0 g of acetic acid, and four liters of deionized water were charged to a 7.6 L autoclave. The autoclave was purged four times with nitrogen and heated to 180° C. with stirring for 60 minutes. After the autoclave had been cooled to room temperature, the contents were removed and filtered. The solid polymer was washed four times with hot (90° C.) deionized water and four times with room temperature (about 25° C.) deionized water.

The treated and washed sample was dried in a vacuum oven at 170° C. to produce Polymer 22. Polymer 22 had a 5 minute flow rate of 48 g/10 min with an extrudate quality rating of 2/2/1/1. Polymer 22 had a 30 minute flow rate of 52 g/10 min with an extrudate quality rating of 3/2/1/2. The ash level of Polymer 22 was 0.04 weight percent.

The PPSS polymer produced by the invention process had good melt stability and good extrudate quality with low ash.

Example XI

This example is a run according to the first embodiment of this invention, where Polymer 20 was first treated with aqueous zinc acetate and was then treated with aqueous acetic acid. A 1250 g sample of Polymer 20, four liters of deionized water, and 5 g of zinc acetate were charged to a stainless steel autoclave. The autoclave was purged four times with nitrogen and heated to 185° C. with stirring for 60 minutes. After the autoclave had been cooled to about 28° C., the contents were removed and filtered and the filtered solid washed with deionized water. The polymer was then washed three times with hot (80°-90° C.) deionized water and the three times with room temperature (about 25° C.) deionized water. This polymer was dried in a vacuum oven at 170° C. overnight to produce a sample designated Polymer 23A.

Polymer 23A had a 5 minute flow rate of 45 g/10 min with an extrudate quality rating of 1/1/1/1. The 30 minute flow rate was 43 g/10 rain with an extrudate quality rating of 3/2/1/1. A relatively high ash value of 0.34 weight percent was determined for Polymer 23A.

Polymer 23A was charged to a stainless steel autoclave with four liters of deionized water and 13 g of acetic acid. The autoclave was purged with nitrogen five times, the stirrer started, and the temperature increased to 180° C. for a 30 minute hold. After the autoclave had been cooled to 27° C., the autoclave was opened and the contents removed and filtered. The solid polymer was rinsed with deionized water and then washed three times with hot (80°-90° C.) deionized water and three times with room temperature (about 25° C.) deionized water. The washed polymer was dried in a vacuum oven overnight at 70° C. to form Polymer 23B.

Polymer 23B had a flow rate of 49 g/10 rain and extrudate quality rating of 2/1/1/1. The 30 minute flow rate was 47 g/10 rain with an extrudate quality rating of 1/2/1/2. Polymer 23B had an ash level of 0.03.

This two-step invention treatment of PPSS produces good quality polymer with low ash. However, the single-step second embodiment invention process described in Examples IX and X does not require the isolation and purification described in this example and can be performed more quickly than the two step invention process.

For easy comparison of the examples, the results from the Examples VIII-XI are summarized in the following Table.

TABLE X

| | | | | | Treated PPSS | | | | |
| | | | | | 5 min. Hold | | 30 min. Hold | | |
| Polymer | Zinc Wash | Acid Wash | Wash Temp., °C. | Wash Time, min. | Flow, Rate g/10 min. | Quality Ratings[a] | Flow Rate g/10 min. | Quality Ratings[a] | Ash, Wt. % |
| --- | --- | --- | --- | --- | --- | --- | --- | --- | --- |
| 20B[b] | No | No | — | — | 31 | 4/4/4/4 | c | c | 0.53 |

TABLE X-continued

| | | | | | Treated PPSS | | | | |
| | | | | | 5 min. Hold | | 30 min. Hold | | |
| Polymer | Zinc Wash | Acid Wash | Wash Temp., °C. | Wash Time, min. | Flow, Rate g/10 min. | Quality Ratings[a] | Flow Rate g/10 min. | Quality Ratings[a] | Ash, Wt. % |
| --- | --- | --- | --- | --- | --- | --- | --- | --- | --- |
| 21. | Yes | Yes | 185 | 60 | — | — | — | — | — |
| | Yes | Yes | 180 | 30 | 54 | 1/1/1/1 | 55 | 1/2/1/2 | 0.02 |
| 22. | Yes | Yes | 180 | 60 | 48 | 2/2/1/1 | 52 | 3/2/1/2 | 0.04 |
| 23A | Yes | No | 185 | 60 | 45 | 1/1/1/1 | 43 | 3/2/1/1 | 0.34 |
| 23B | Yes | Yes | 180 | 30 | 49 | 2/1/1/1 | 47 | 1/2/1/2 | 0.03 |

[a]Extrudate quality (Gas/Color/Clarity/Surface) on scale of 1 to 4 with being the best rating.
[b]Washed three times with hot water and three times with room temperature water.
[c]No = not determined.

Although this invention has been described in detail for purposes of illustration, it is not meant to be limited thereby, but is intended to cover all reasonable modifications thereof.

That which is claimed is:

1. A method of treating a poly(arylene sulfide/sulfone) polymer in order to increase said polymer's thermal stability and purity, which method comprises
   a) contacting a poly(arylene sulfide/sulfone) polymer at a temperature in the range of 0° C. to 300° C., for a time period of about ½ minute to 30 hours with a water soluble zinc compound in an acidic solution;
   b) then recovering said polymer.

2. A method according to claim 1 wherein said poly(arylene sulfide/sulfone) polymer is poly(phenylene sulfide/sulfone).

3. A method according to claim 1 wherein said poly(arylene sulfide/sulfone) polymer is produced by reacting a dihaloaromatic sulfone, an alkali metal sulfide, a polar organic compound, with or without water under polymeriztion condtions to form a reaction slurry comprising a poly(arylene sulfide/sulfone) polymer; and then recovering said poly(arylene sulfide/sulfone) from said reaction slurry.

4. A method according to claim 1 wherein said water soluble zinc compound is selected from the group consisting of zinc halides and zinc carboxylates and wherein the concentration of zinc in said acidic solution is 0.01 to 10 weight percent based on the weight of the neat polymer.

5. A method according to claim 4 wherein zinc acetate is said zinc compound.

6. A method according to claim 1 wherein the acidic component of said acidic solution is present in an amount in the range of about 0.01 to 10 weight percent, based on the weight of the polymer.

7. A method according to claim 1 wherein the acid in said acidic solution is selected from the group consisting of acetic acid, oxalic acid, formic acid, and phosphoric acid.

8. A method according to claim 7 wherein the acid in said acidic solution is acetic acid.

9. A method according to claim 1 wherein said recovered polymer is further washed with deionized water.

10. A method according to claim 9 wherein the temperature of said water washing step is in the range of ambient temperature to 250° C.

11. A method for treating a poly(arylene sulfide/sulfone) polymer which comprises
    a) contacting a poly(arylene sulfide/sulfone) polymer with an aqueous acidic solution consisting essentially of zinc acetate in an aqueous acetic acid at a temperature in the range of 40° to 200° C. for a period of 1 minute to 3 hours wherein the concentration of zinc in said acidic solution is in the range of 0.25 to 2 weight percent, based on the weight of said polymer and the acetic acid component is present in an amount of about 0.025 to 5 weight percent of the acidic solution; and then
    b) recovering the thus treated poly(arylene sulfide/sulfone) polymer.

12. A method for treating a poly(arylene sulfide/sulfone) polymer which comprises
    a) contacting a poly(arylene sulfide/sulfone) polymer with an aqueous acidic solution consisting essentially of zinc acetate in an aqueous phosphoric acid at a temperature in the range of 40° to 200° C. for a period of 1 minute to 3 hours wherein the concentration of zinc in said solution is in the range of 0.25 to 2 weight percent, based on the weight of said polymer and the phosphoric acid component is present in an amount of about 0.025 to 5 weight percent of the acidic solution; and then
    b) recovering the thus treated poly(arylene sulfide/sulfone) polymer.

13. A poly(arylene sulfide/sulfone) polymer of increased thermal stability and purity treated by the method of claim 1.

14. A poly(arylene sulfide/sulfone) polymer of increased thermal stability and purity prepared by the method of claim 11.

15. A molded article made from a poly(arylene sulfide/sulfone) polymer prepared by the method of claim 1.

16. A composite material which comprises a poly(arylene sulfide/sulfone) polymer prepared according to claim 1 and carbon fibers.

* * * * *